Oct. 7, 1941.   W. L. JEFFREY   2,258,289
TREE MOVER
Filed Jan. 15, 1940   2 Sheets-Sheet 1
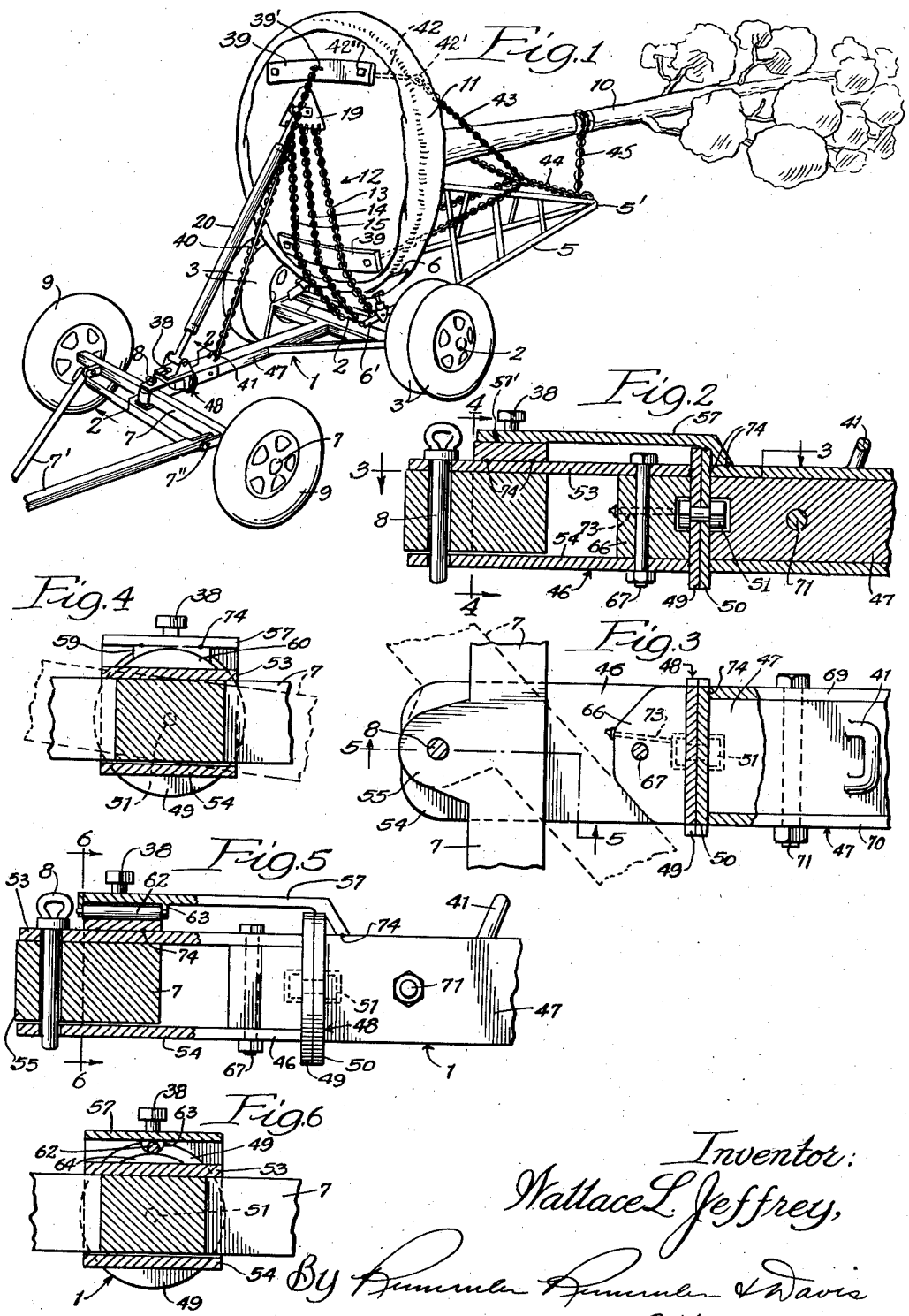
Inventor:
Wallace L. Jeffrey,
By Rummler Rummler & Davis
Attorneys.

Oct. 7, 1941.  W. L. JEFFREY  2,258,289
TREE MOVER
Filed Jan. 15, 1940  2 Sheets-Sheet 2
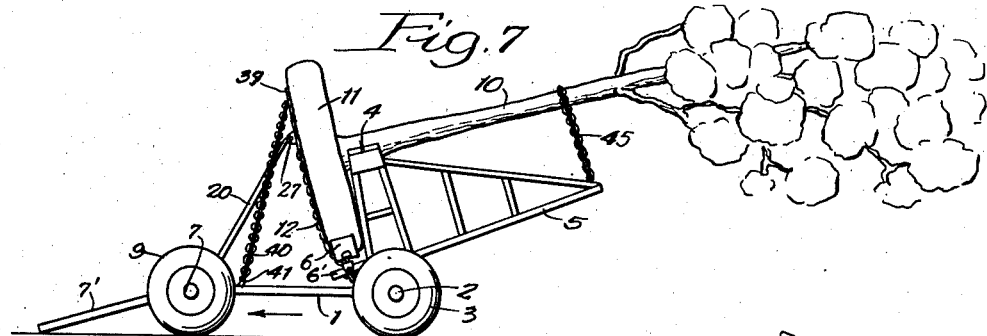
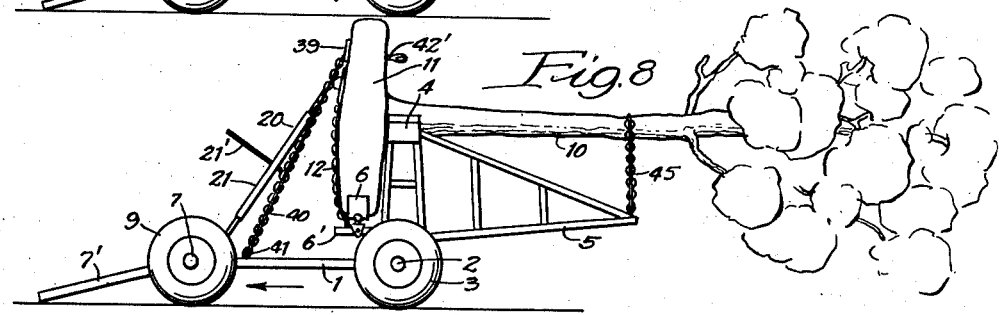
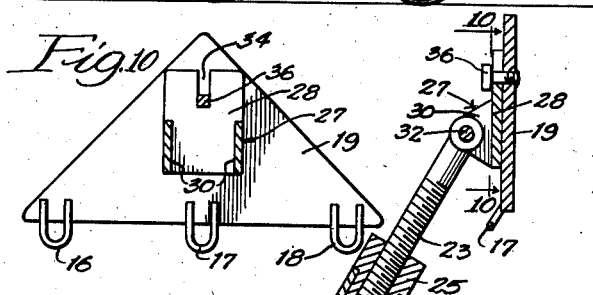
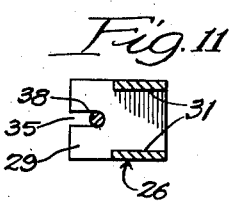
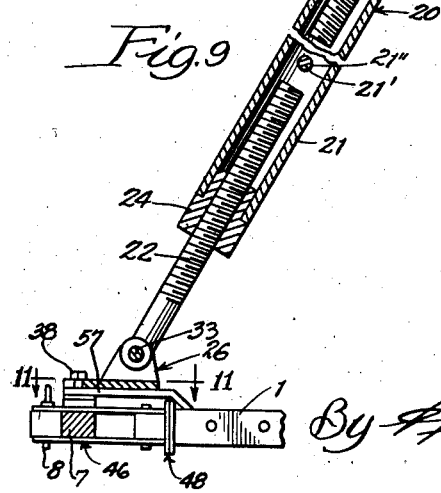
Inventor:
Wallace L. Jeffrey,
By Hummer Hummer & Davis
Attorneys.

Patented Oct. 7, 1941

2,258,289

UNITED STATES PATENT OFFICE 2,258,289

TREE MOVER

Wallace L. Jeffrey, Fulton, Mo.

Application January 15, 1940, Serial No. 313,948

6 Claims. (Cl. 214—3)

This invention relates to improvements in vehicular tree movers and more particularly to means for adjustably changing and fixing the vertical angular position or tilt of the tree and bunk chassis, especially when enroute. Such changes are often necessary during transport, as for passage under bridges, wires and the like. The invention also relates to link-reach and front axle coupling means adapted to accommodate relative sidewise rocking of the front and rear parts of the wheeled running gear; and especially to features thereof adapted for reception and support of the foot of an adjustably extensible root-ball prop, as will appear.

During normal travel the tree must be held with its trunk rearwardly inclined upwardly toward the top. It cannot well lie horizontally while being transported. This is because the rear part or support proper, that is to say, the bunk-chassis, must be tilted normally in use, with its load, so as to bring the center of gravity sufficiently in front of the rear axle (as shown in Fig. 7) so as to prevent downward tilting of the chassis and tree rearwardly by gravity in transit.

Heretofore during transportation of a tree from one location to another, much delay has often been caused by tree-top interference with low-hung service wires, power and telephone, extending across the roadways. The earlier carriers held the trees set at an angle upwardly to the rear, such that the top branches often caused trouble. Then, in order to clear the wires, it was necessary to disconnect the motor truck from the mover proper in order to utilize the power winch, with block and tackle, by which to change the vertical angular tilt of the bunk-chassis and tree by swinging the top downward to a nearly horizontal position; and then restoring the tilted position after passage under the obstruction. This operation usually required the services of three or more men and took at least thirty minutes, though usually longer, before the mover could proceed.

The main objects of this invention are to provide an improved tree mover having means to adjust, readily and manually, the relative angular position or tilt of the combined tree and bunk-chassis during transport; to provide a coupler mechanism for such a tree mover which will prevent displacement of the tree-trunk and root-ball adjusting mechanism or prop in use; and to provide in a front coupler-mechanism for tree movers a compensator or rocker for maintaining the loaded tree-mover carriage or chassis and its ball-prop in substantially constant relative position when set for travel.

This invention is illustrated by the accompanying drawings in which:

Figure 1 is a perspective view of my tree mover loaded and disposed horizontally for passing under an overhead obstruction in transport, the travel being from right to left.

Fig. 2 is an enlarged fragmentary cross sectional view taken on the line 2—2 of Fig. 1.

Figs. 3 and 4 are cross sectional views taken on the lines 3—3 and 4—4 respectively of Fig. 2.

Fig. 5, except for a bearing roller being added, is in part (at the left) a cross sectional view taken as on the line 5—5 of Fig. 3, the rest (at the right) being a side elevation.

Fig. 6 is a cross sectional view taken on the line 6—6 of Fig. 5.

Fig. 7 is a side view of the mover showing the tree in its normal somewhat tilted position where held by the shortened ball-prop and prop supplementing chains during transport.

Fig. 8 is a view similar to Fig. 7, but showing the tree trunk in a substantially horizontal position, with the chain and ball-prop elongated.

Fig. 9 is a longitudinal sectional view through an extensible apparatus or prop to adjust angularly the position of the tree and bunk chassis relative to horizontal.

Figs. 10 and 11 are cross sectional views taken on the lines 10—10 and 11—11 respectively on Fig. 9.

Referring first to Figs. 1, 7 and 8, the mover as a whole, apart from some necessary tractor device (not shown), comprises certain operatively connected parts. These are (1) a two-wheeled tower-and-bunk chassis to receive and rigidly support the tree, (2) a two-wheeled front axle and forward reach device which is attachable to whatever tractor is available, (3) a link-reach having a narrow front end for universal pivotal connection to the front axle and a wide rear end for hinge-like pivotal connection to the rear axle and (4) a prop-and-chain system to regulate and hold the tilt of the tree-chassis relative to the link-reach.

Referring more in detail to the drawings, the tree mover of my invention comprises in part a linking reach 1, the broad rear end of which is removably secured pivotally to the rear axle 2 carried by tread wheels 3, a bunk 4 to receive the trunk, a tower 5 and a rootball cradle 6. Members 2, 4, 5, and 6 constitute the main carrier chassis. The narrow forward end of said reach 1 is detachably secured by a coupling mechanism to a front axle 7 carrying a drawbar 8 and having tread wheels 9.

The trunk of tree 10 rests normally on bunk 4 and the rootball 11 rests on said cradle 6. The top of the tree trails rearwardly over and past the tower 5, to which the trunk is secured. The rootball is held by gravity and by the supplemental cradle-like chain structure 12 comprising a series of spaced chains 13, 14 and 15, secured at their lower ends to said rear axle and at their other ends to spaced anchor-eyes 16, 17 and 18 on rootball plate 19. The effective length of these chains is adjustable, as will be understood.

To further prevent downward tipping of the rootball and to provide for adjustment thereof, I have provided a variable length prop or brace 20 of turnbuckle-like style, comprising a sleeve 21, and a pair of long screws 22 and 23 adapted to engage the right-and-left threaded nuts 24 and 25 respectively, which are integrally secured to the ends respectively of sleeve 21.

I also provide feet 26 and 27 cross-pivotally secured to the distal ends of the screws 22 and 23 respectively. Each foot comprises a bottom plate 28 or 29 respectively and a pair of side plates 30 or 31 respectively, both perforated at their protrudent ends respectively to receive the pivot bolts 32 or 33 respectively. Each bottom plate is slotted endwise as at 34 or 35, parallel with the side plates. The rootball plate 19 is provided with a headed stud 36 to which the prop-foot 27 is anchored. The lower prop-foot 26 is held in place on the forward part of reach 1 by means of a headed bolt 38 set in the upper side of reach 1 as viewed on Figs. 1, 2, 4, 5, 6 and 9.

The sleeve 21 is formed and adapted for forcible turning, as by means of a hand lever 21', removably engaging hole 21'', whereby said prop 20 may be lengthened or shortened as desired.

The plate 19 is held in place against the bottom of the rootball 11 by said prop 20, well up on one side as viewed in Figs. 1, 7 and 8, more-or-less adjacent to the neighboring lift-plate 39.

I provide an adjustable chain 40 to prevent possible accidental rearward tipping of the tree and bunk-chassis in use, as to the right in Fig. 7. One end of this chain is attached to the middle of the upper plate 39 as at 39' and its other end is attached to the forward part of reach 1 where a staple-like member 41 is formed or set, as will be further explained.

The plates 39 are held in place by bolts 42 which extend through the rootball and are engaged at their opposite ends by lift chains or cables 43 leading to a common cable 44 which extends to the apex 5' of tower 5, from which point another cable 45 extends to the trunk of the tree. The bolts 42 are formed on their top ends with loops or eyes 42' instead of heads, and their lower ends are threaded to receive nuts 42'' which bear upwardly against said plates 39. The said loops receive the lower ends of said cables 43, respectively.

The rootball is usually so large and heavy that it far overbalances the rest of the tree as it rests on the bunk 4. Even more do the tree and chassis as a whole tend to tilt thus, as toward the left as viewed in Figs. 1, 7 and 8.

The reach 1 is wide at the rear edge where it is detachably pivoted hingewise to the chassis axle 2; and it is narrow and bar-like in front where it is specially formed to accommodate certain functions as will appear. Here the front end part 46 of bar 47 of the reach 1 is swivel-connected as at 48, where the front and rear friction face-plates 49 and 50 are held together by a pivot bolt 51.

Secured to the top and bottom of part 46 are clevis plates 53 and 54 which project forward and embrace the front axle 7 and its forward pivot-hump 55 where held in place by the pivot pin 8.

A shelf 57 is fixed on reach 1 just back of the joint 48 of bar 47 and extends forward over front part 46. It carries the prop-engaging bolt 38 directly over the axle 7, and rests on rocker-bearing means such as one of those shown in Figs. 2 to 6.

In Figs. 2 and 4 the shelf 57 has, fixed on its underside, a downwardly facing arcuate bearing block 59, and the top clevis plate 53 has an upwardly convex bearing block 60 to receive block 59, so that the thrust of prop 20 will come most efficiently on the middle of axle 7 and without any working strains.

In Figs. 5 and 6 the shelf support is modified in that a bearing roller 62 is journalled on its underside by means of end-brackets 63 and the convex bearing on plate 53 is appropriately modified as shown at 64.

The substantially triangular core 66, of front part 46 is clamped in place between said plates 53 and 54 by bolt 67, with its rearward base seated against friction-plate 49. The forward end of bar 47 is clamped between plates 69 and 70 by horizontal bolts, as at 71. Parts 69 and 70 may be formed integrally as part of a socket to receive the forward end of bar 47 and the eye-lug 41 may be cast therewith.

The V-shaped axle bumper or core 66, above referred to, prevents the axle 7 from cutting far enough to allow either wheel 9 to strike the reach 1. Oil is supplied to the swivel joint at 51 through the well 73 and to bearing 59 through well 57'. Spot weldings are indicated by numeral 74.

My novel prop support 57, rigid with the body of reach 1 and extending over the swiveled part 46 and having lateral swing bearing thereon, permits transmittal of the load thrust from prop 20 directly downward onto the axle 7, as accommodated by the forward set of the reach-and-axle pintle 8, and without any shift of the prop base relative to the main body part of reach 1.

*Operation*

Assuming that the tree 10 has been loaded onto the tower-and-bunk chassis in any preferred manner, as for instance substantially in the way shown by my copending application, Serial No. 263,815, filed March 23, 1939, and while held in a position about as in Fig. 7, I set in place the front running gear (7—7'—9 etc.) and link it to the tree chassis or trailer (2—3—4—5) by the reach 1, first making the hinge connection at the rear axle 2 and then the front pivot connection at 8.

I then set the expansion turnbuckle or prop 20 in place, together with the chains 12 and 40. The winch and truck, not shown, are then removed and the prop takes its load. Then using the leverage bar 21', I adjust the prop to give the desired tilt to the tree chassis and its load. The chain 40 is then set tight. When the prop is screwed in it allows the weight of the ball to ride further front (left in Figs. 1, 7 and 8), incident to corresponding tilt of the trailer, making greater speed possible on country roads without causing the trailer and its load to swerve.

As will be apparent from Fig. 8, the tilt adjustment can be made by one man using bar 21', and without any locking of wheels or disconnecting of the reach 1, axle 7 or the tractor. This can be effected in about two minutes or less as compared with about half an hour required when it was necessary to lock the wheels 3, unhitch the tractor and move to the rear and lock its wheels and then use the hand winch.

This device handles full grown forest trees, with rootballs ranging up to nine feet or more in diameter. But it is easy to operate and requires but little special skill.

It is to be understood that some of the details set forth may be altered or omitted without departing from the spirit of my invention as defined by the following claims.

I claim:

1. A live-tree mover comprising a two-wheeled chassis to receive the tree and means to hold it selectively and adjustably at a desired vertical angle, comprising a forward running gear with a link-reach connecting it to said chassis with the latter in vertically tilting relation thereto and an adjustable-length prop extending from the rootball to the forward part of said reach, the latter having a swivel tip parallel with its main axis and the main reach part having a shelf overlapping the swivel and receiving the base of said prop to support the latter.

2. In a device of the class described a tree-chassis having two wheels on which it is tiltable for loading, tree-transport and unloading, a triangular reach hinged rearwardly to the chassis adjacent its wheel axis, a forward running gear to which the front of said reach is flexibly connected, a prop of adjustable length extending from said reach to the rootball when loaded, and said reach at its front having an elevated platform extending over the front tip of the reach to receive and anchor the lower end of said prop.

3. A vehicular device of the class described comprising a tilting load part having a rear axle, a forward reach therefor, a front axle to which the forward end of said reach is pivoted and a prop attachable to said reach, said front axle having a forward hump perforated to receive a vertical coupling pivot, the front end part of said reach being swiveled on the main axis of the reach and having vertically spaced extension plates to embrace said front axle and receive the ends of said pivot, said reach back of its swivel having a shelf mounted thereon and extending forward over said swiveled end part and bearing rockably on said swiveled part, said prop having pivoted on its lower end a foot releasably engageable with the top part of said shelf, and said prop at its other end being adapted to engage the load to fix the tilt of said load part.

4. A tree mover of the class and kind described having a brace to control the tilt of the treeball, a forward reach and a front axle to which said reach is pivoted at its front end for horizontal turning, the front end part of said reach being swiveled on the main axis of said reach and having an upwardly convex bearing face and the main body of said reach having a shelf extending forward over said face and having a bearing roller to travel on said face, said brace having a foot pivoted thereto for releasable engagement with said shelf on which said foot rests, and the other end of the brace being adapted to engage the treeball.

5. A tree moving vehicle comprising a tilting chassis to receive the tree with its top disposed rearwardly, a forward reach hinged thereto, and a forward running gear to which said reach is pivoted, in combination with a top-plate secured to the bottom of the tree-ball, a chain tensionally connecting said plate and a forward part of said reach, a minor plate also disposed against the rootball, and an adjustable length brace pivoted to the forward end of said reach and having thrustwise engagement with said minor plate.

6. A vehicular device of the class described comprising a load carrying tilt body, a front running gear, a reach connecting the same, and a brace, said reach having a swivel front and a shelf carried rigidly by the rearward part of said reach and extending forward over the swivel-held part to receive and pivotally hold one end of said brace, and the other end of the brace being adapted to engage the load and so fix the tilt of said body.

WALLACE L. JEFFREY.